(12) United States Patent  (10) Patent No.: US 9,090,752 B2
Ponomarev et al.  (45) Date of Patent: Jul. 28, 2015

(54) MULTI-LAYERED CARBON NANOPARTICLES OF THE FULLEROID TYPE

(75) Inventors: Andrey Ponomarev, Saint Petersburg (RU); Mikhail Iudovich, Saint Petersburg (RU)

(73) Assignee: Andrey Ponomarev, Saint Petersburg (RU)

( * ) Notice: Subject to any disclaimer, the term of this patent is extended or adjusted under 35 U.S.C. 154(b) by 0 days.

(21) Appl. No.: 13/384,710

(22) PCT Filed: Jul. 21, 2009

(86) PCT No.: PCT/RU2009/000364
§ 371 (c)(1),
(2), (4) Date: Jan. 18, 2012

(87) PCT Pub. No.: WO2011/010946
PCT Pub. Date: Jan. 27, 2011

(65) Prior Publication Data
US 2012/0114946 A1  May 10, 2012

(51) Int. Cl.
*C01B 31/00* (2006.01)
*B82Y 99/00* (2011.01)
*C08K 3/04* (2006.01)
*B82Y 30/00* (2011.01)
*B82Y 40/00* (2011.01)
*C01B 31/02* (2006.01)

(52) U.S. Cl.
CPC . *C08K 3/04* (2013.01); *B82Y 30/00* (2013.01); *B82Y 40/00* (2013.01); *C01B 31/0213* (2013.01); *C08K 2003/045* (2013.01); *C08K 2201/004* (2013.01); *C08K 2201/011* (2013.01); *C08K 2201/014* (2013.01); *Y10T 428/2991* (2015.01)

(58) Field of Classification Search
None
See application file for complete search history.

(56) References Cited

U.S. PATENT DOCUMENTS

| 4,316,925 A | | 2/1982 | Delmonte | |
|---|---|---|---|---|
| 5,464,987 A | * | 11/1995 | Ihara et al. | 250/492.3 |
| 2008/0017507 A1 | * | 1/2008 | Ramamurthy et al. | 204/400 |
| 2010/0255303 A1 | * | 10/2010 | Wardle et al. | 428/378 |

FOREIGN PATENT DOCUMENTS

| DE | 3139904 A | 7/1982 |
|---|---|---|
| EP | 0431503 B1 | 6/1991 |
| JP | 07-165406 A | 6/1995 |
| RU | 2036298 C1 | 5/1995 |
| RU | 2051135 C1 | 12/1995 |

(Continued)

OTHER PUBLICATIONS

International Preliminary Report on Patentability of PCT/RU2009/000364, dated Jan. 24, 2012.

(Continued)

*Primary Examiner* — Ronak Patel
(74) *Attorney, Agent, or Firm* — Westerman, Hattori, Daniels & Adrian, LLP

(57) ABSTRACT

Multi-layered carbon nanoparticles of the fulleroid type having an inter-layer distance in a range of from 0.34 to 0.36 nm, wherein the nanoparticles have a toroidal shape, a ratio between an outer diameter and a thickness of a multi-layered body of said toroidal nanoparticles being comprised in a range of from 10:1 to 3:1, and an averaged size being in a range of from 15 to 100 nm as measured by transmission electron microscope.

20 Claims, 2 Drawing Sheets

(56) References Cited

FOREIGN PATENT DOCUMENTS

Figure 1:
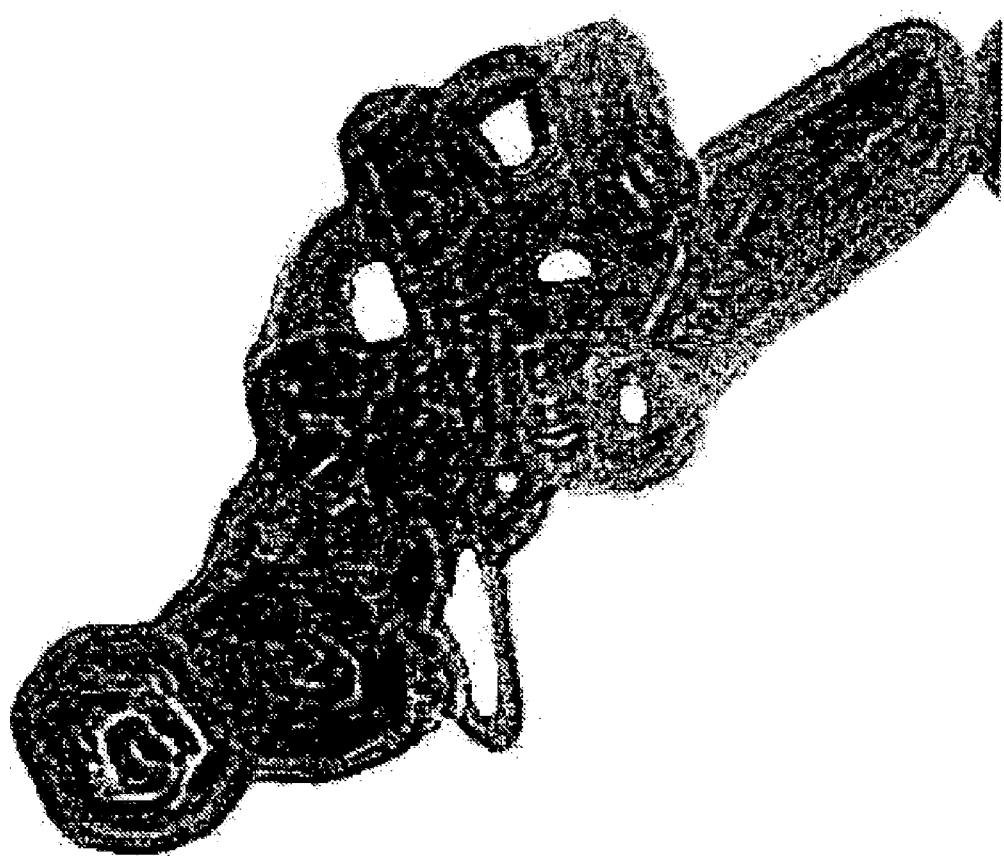

| | | |
|---|---|---|
| RU | 2068489 C1 | 10/1996 |
| RU | 2085394 C1 | 7/1997 |
| RU | 2196731 C2 | 1/2003 |
| RU | 2223304 C1 | 2/2004 |
| RU | 2223988 C2 | 2/2004 |
| RU | 2233254 C2 | 7/2004 |
| RU | 2247759 C1 | 3/2005 |
| RU | 2281262 C1 | 8/2006 |
| RU | 2281341 C2 | 8/2006 |
| RU | 2007/109731 A | 9/2008 |
| RU | 2345968 C2 | 2/2009 |
| RU | 2354526 C2 | 5/2009 |
| RU | 2397950 C2 | 10/2009 |
| RU | 2436749 C2 | 4/2011 |
| RU | 2437902 C2 | 4/2011 |
| WO | 94/20274 A1 | 9/1994 |
| WO | 03/093175 A1 | 1/2003 |
| WO | 2007/024838 A1 | 3/2007 |
| WO | 2008/041965 A2 | 4/2008 |
| WO | 2011/010947 A1 | 1/2011 |
| WO | 2011/010948 A1 | 1/2011 |

OTHER PUBLICATIONS

International Preliminary Report on Patentability of PCT/RU2009/000562, dated Jan. 24, 2012.
International Preliminary Report on Patentability of PCT/RU2009/000563, dated Jan. 24, 2012.
Tomishko et al., "Multi-layered carbon nanotubes and their application," Russian Chemical Journal (Journal of the D.I. Mendeleev Russian Chemical Society) 2008, vol. LII, n°5, pp. 39-43 w/English machine-translation cited in prosecution of RU2437902C2.
Han Jie, "Toroidal Single Wall Carbon Nanotubes in Fullerene Crop Circles" MRJ, Inc. at NASA Ames Research Center, 1997 cited in ISR.
International Search Report of PCT/RU2009/000364, mailing date Apr. 8, 2010.
International Search Report of PCT/RU2009/000562, mailing date Apr. 15, 2010.
International Search Report of PCT/RU2009/000563, mailing date Apr. 15, 2010.
Chinese Patent Office Action dated Mar. 11, 2014 in CN appl. No. 200980160650 (corres. To PCT/RU2009/000364); w/English translation.
Han, "Energetics and structures of fullerene crop circles", Chemical Physics Letters, vol. 282, pp. 187-191 (1998); cited in Chinese Office Action.
Supplemental European Search Report dated Oct. 10, 2013 in EP appl, No. 09847620.3 (corres. to PCT/RU2009/000364).
Indian Patent Office Action dated May 18, 2015 in counterpart IN appl. No. 168/MUM/2012; in English (2 pages).
Indian Patent Office Notice of Opposition dated May 18, 2015 in counterpart IN appl. No. 168/MUM/2012; in English (5 pages).
Harris, Peter J.F., "Carbon Nanotubes and Related Structures—New Maerials for the Twenty-first Century", Reprint 4th Ed., Cambridge, UK, 2001; cover page information and google books link; in English; cited as D4 in Indian Patent Office Action dated May 18, 2015 (2 pages).

\* cited by examiner

MULTI-LAYERED CARBON NANOPARTICLES OF THE FULLEROID TYPE

TECHNICAL FIELD

The invention relates to the chemistry of carbon and, in particular, to obtain carbon multi-layered nanoparticles of the fulleroid type.

The particles of the fulleroid type have a caracteristic structure presenting an uninterrupted network consisting of 5-, 6-membered rings with alternating σ and π-bonds.

The multi-layered particles have a distance between the layers equal to 0.34-0.36 nm. The structure of the fulleroid nanoparticles determines their ability to a low-intensive, intensive or anomalously high dispersion interaction which being evident via a feasible growth of the electric field intensity of an electromagnetic wave ingoing to the said particle.

PRIOR ART

The multi-layered carbon nanoparticles of the fulleroid type—the multi-layered carbon nanotubes—are the nanoparticles of the tubular shape having a rather wide range of sizes: a length of 10-100 000 nm; an outer diameter of 1-500 nm, a wall thickness of 0.1-200 nm. The nanotubes are obtained by extracting of the cathode deposit obtained by an arc evaporation of a graphite anode [application JP no 07-165406, M.cl. SO1V, 31/00, 1995].

The multi-layered nanotubes have practically no effect of a force interaction in inter-electrode gaps during a self-emission from cathodes comprising these nanoparticles. Besides, the value of an electric field gain factor realized on the cathode surface comprising the nanotubes, is small that does not permit to obtain a high level of the dispersion interaction on the boundaries of various media.

It is known the polyhedral multi-layered carbon nanoparticles of the fulleroid type having the inter-layer distance of 0.34-0.36 nm and the averaged particle size of 60-200 nm [RU patent no 2196731, M.cl. SO1V, 31/02, 2003].

The polyhedral multi-layered carbon nanoparticles are $4^{th}$-$7^{th}$-side polyhedrons with an internal slit-like capillary. They can have also a ramified form and may not comprise the internal capillary, or they may have the form of a flattened polyhedron whose the outer diameter exceeds the length of the nanoparticle.

The polyhedral multi-layered carbon nanoparticles of the fulleroid type are extracted from a crust of the cathode deposit obtained by evaporation of the graphite anode during the arc process. The method of manufacturing includes a gas-phase oxidation of the milled crust of the cathode deposit and a subsequent liquid-phase oxidation of the carbon powder in a melt of a mixture of hydroxide and potassium nitrate, as it is shown in RU 2196731.

The polyhedral multi-layered carbon nanoparticles possess a number of valuable properties: they contribute to structuring of concretes [RU patent no 2233254, 2004], increase a wear resistance of alloys [RU patent no 2281341, 2003], are highly resistant against a thermal degradation [RU patent no 2196731, 2003], and so on. However, a random nature of their distribution in sizes and shapes does not permit to realize the effect of the force interaction in the inter-electrode gap during the self-electron emission from the cathodes manufactured from these nanoparticles, and to achieve high values of the gain factor of the electric field on their surface that would provide the highest level of the dispersion interaction at the interfaces of the phases in various media.

DISCLOSURE OF THE INVENTION

The purpose of the invention is to obtain multi-layered carbon nanoparticles of the fulleroid type giving high values of the force interaction in the inter-electrode gap during the self-electron emission from the cathode manufactured from the said particles.

According to the invention, the multi-layered carbon nanoparticles of the fulleroid type with the inter-layer distance of 0.34-0.36 nm have a toroidal shape, the ratio between the outer diameter and the thickness of the multilayered body of the torus being comprised in the range of from 10:1 to 3:1, and the averaged size of the nanoparticles 15-100 nm.

The toroidal multi-layered carbon nanoparticles of the fulleroid type are obtained via selecting of sizes and shapes of the multi-layered carbon nanoparticles by their separation into an electric field, as described in the paper of Brozdnichenko A. N. & all. ["Journal of Surface Investigation. X-ray, Synchrotron and Neutron Techniques" 2007, no 2, p. 69-73]. In order to obtain the nanoparticles of the said shape, a cathodic plate is placed in a vacuum volume; the multi-layered carbon nanoparticles obtained by oxidation as a result of previous operations are placed on the cathodic plate; and, parallel to it, an anodic plate manufactured from a nonmagnetic material such as tantalum is placed. After connecting the anode and the cathode to a high-voltage source, they apply a supply and they increase gradually the potential difference operating in the inter-electrode gap. When the field intensity reaches 800-1000 V/mm, a self-emission current starts to appear. If the self-emission current increases, an emergence of an attractive anode/cathode force is registered by a vacuum dynamometer on which the anodic plate is fixed. Starting with a certain value of the self-emission current, a part of multi-layered carbon nanoparticles migrates from the cathode to the anode; at the same moment, the force acting in the inter-electrode gap stops growing. After that, the voltage applied on the cathode and on the anode is removed; the vacuum volume is filled with an inert gas and the multi-layered carbon nanoparticles accumulated on the anodic plate are collected.

The multi-layered carbon nanoparticles isolated in such a way have a toroidal shape, the ratio between the outer diameter and the thickness of the body of the torus being comprised in the range of from 10:1 to 3:1, as shown by studies carried out with the help of a transmission electron microscope, such as JEM-100C.

Figure 2:
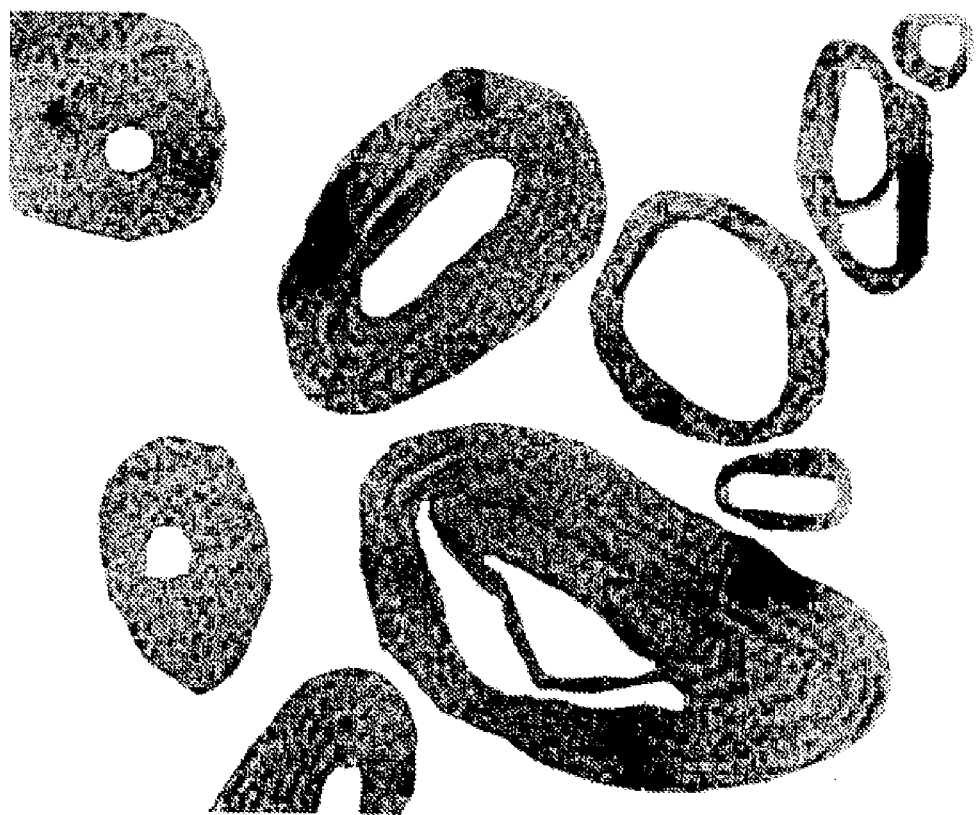

Micro photographs of the obtained nanoparticles are represented in FIG. 1-2.

An image of the multi-layered carbon nanoparticles of the fulleroid type agglomerated in the shape of a bundle of tori, is represented in FIG. 1.

An image of the toroidal multi-layered carbon nanoparticles of the fulleroid type at a high magnification which allows determining the ratio between the outer diameter of the thorus and the thickness of its body, is represented in FIG. 2.

The presented invention is illustrated by examples but is not limited to them.

EXAMPLE 1

The cathode deposit is obtained by an electro-arched erosion of the anode graphite rod with a section of 30-160 $mm^2$ at a current density of 80-200 $A/cm^2$ and a voltage drop on the arc of 20-28 V in a helium atmosphere at a pressure of 40-100 Torr. They separate a dense crust of the cathode deposit from a loose middle, mill it and place it in a rotating quartz tube located in a superhigh frequency field with a frequency of 2.5 GHz and a power of 500-1500 Wt. After 100-150 min of the gas-phase oxidation under these conditions, the obtained powder is cooled and placed in a vacuum volume on the negative electrode in the inter-electrode space between the cathode and the anode. After that the potential difference between the cathode and the anode is increased until the self-emission current appears. With increasing of the self-emission current a part of multi-layered carbon nanoparticles migrates to the positive electrode. At the end of the process, they are collected from the surface of the anode and converted into dispersion in an organic solvent such as dimethylformamide.

EXAMPLE 2

The product is obtained as in Example 1, but the gas-phase oxidation is carried out in an atmosphere comprising an excess quantity of oxygen, for example, from 20% to 60%.

EXAMPLE 3

The product is obtained as in Example 1, but after the gas-phase oxidation the multi-layer carbon nanoparticles are additionally oxidized electrochemically in an aqueous electrolyte comprising solutions of chlorine compounds.

EXAMPLE 4

The product is obtained as in Example 1, but the isolation of the torus-like multi-layered carbon nanoparticles is carried out under the electric field in a dielectric medium with a high value of a dielectric permeability (such as white-spirit).

EXAMPLE 5

The product is obtained as in Example 1, but after the gas-phase oxidation they cool additionally the multi-layered carbon nanoparticles by placing in a medium of a liquid gas (nitrogen, helium), bubble and separate the deposit from the liquid phase followed by an evaporation of the liquid gas and obtaining of two types of the carbon powder which is further processed, as shown in Example 1.

In order to determine electrophysical characteristics, they separate the product from the solvent and examine as per the following parameters:
- radiographically they determine the inter-layer distance in multi-layered carbon nanoparticles which is equal to 0.34-0.36 nm, this value being characteristic for carbon compounds of the fulleroid type;
- using the transmission electron microscope, for example JEM-100C, and standard samples of latex beads, they determine the sizes, the shape and the ratio between the outer diameters of the torus-like nanoparticles and the thickness of their multi-layered body.

A self-emission cathode has been manufactured from the obtained toroidal nanoparticles by means of coating them on an electroconductive substrate. Self-emission cathodes with multi-layered nanotubes and polyhedral multi-layered carbon nanoparticles according to RU 2196731 have been produced in a similar manner.

The force interaction in the inter-electrode gap was determined for the said self-emission cathodes. The parameters are presented in the Table.

The Table shows that the force acting in the inter-electrode gap in the case of a negative electrode manufactured from the toroidal multi-layered carbon nanoparticles of the fulleroid type, is different from the values of these forces for the electrodes from the multi-layered nanotubes and the polyhedral multi-layered carbon nanoparticles of the fulleroid type obtained in accordance with RU 2196731.

TABLE

Indicators of the force interaction for the electrodes from the multi-layered carbon nanoparticles of the fulleroid type according to the claimed technical solution

| n°: | Description and structure of the negative electrode material | Intensity of the electric field, V/mm | Value of the self-emission current, µA | Value of the force acting in the inter-electrode gap, N |
|---|---|---|---|---|
| 1 | 2 | 3 | 4 | 5 |
| 1. | Multi-layered carbon nanotubes | 800 | 500 | 0.001 |
| 2. | Polyhedral multi-layered carbon nanoparticles of the fulleroid type | 1000 | 200 | 0.01 |
| 3. | Toroidal multi-layered carbon nanoparticles of the fulleroid type with the average size of the particles 15-100 nm and the ratio between the outer diameter of the toroidal nanoparticle and the thickness of the multi-layered body of the thorus from 10:1 to 3:1 | 1000 | 100 | 0.1 |

INDUSTRIAL APPLICATION

The obtained product, due to the high value of the gain factor of the electric field on the surface of these toroidal multi-layered carbon nanoparticles of the fulleroid type, can be applied in electronic devices that use the effect of the force interaction in the inter-electrode gap during the self-electron emission (sensors of dynamic parameters); as a component of a nonlinear optical media; as well as a reinforcing agent for structural composite materials and as a plasticizing agent for concretes in the building.

The invention claimed is:

1. Multi-layered carbon nanoparticles of the fulleroid type having an inter-layer distance in a range of from 0.34 to 0.36 nm, wherein the nanoparticles have a toroidal shape, a ratio between an outer diameter and a thickness of a multi-layered body of said toroidal nanoparticles being comprised in a range of from 10:1 to 3:1, and an averaged size being in a range of from 15 to 100 nm as measured by transmission electron microscope.

2. A Method for producing the multi-layered carbon nanoparticles of the fulleroid type according to claim 1, comprising:
   placing a cathodic plate and an anodic plate manufactured from a non-magnetic material in a volume with a dielectric medium, the cathodic plate and the anodic plate being adapted to form an inter-electrode gap,
   placing a powder derived from multi-layered carbon nanostructures previously obtained by a gas-phase oxidation, on the cathodic plate;
   fixing the anodic plate on a dynamometer,
   connecting the cathodic plate and the anodic plate to a source;
   exposing the powder on an electric field by applying a supply to the cathodic plate and to the anodic plate;

increasing the potential difference between the cathodic plate and the anodic plate until appearing of a self-emission current in the inter-electrode gap;

registering by the dynamometer an attractive anode/cathode force as a function of the self-emission current;

removing the potential difference applied on the cathodic plate and on the anodic plate when the force acting in the inter-electrode gap stops growing;

filling the volume with an inert gas;

collecting the multi-layered carbon nanoparticles of the fulleroid type accumulated on the anodic plate, determining radiographically an inter-layer distance of the multi-layered carbon nanoparticles of the fulleroid type, determining a shape, an averaged size, a ratio between an outer diameter and a thickness of a multi-layered body of the multi-layered carbon nanoparticles of the fulleroid type under a transmission electron microscope.

3. The method of claim 2, wherein the anodic plate is manufactured from tantalum.

4. The method of claim 2, wherein the dielectric medium consists in white-spirit.

5. The method of claim 2, wherein the dielectric medium consisting in a vacuum and wherein the dynamometer is adapted for the vacuum.

6. The method of claim 2, further comprising:
converting into dispersion in an organic solvent the multi-layered carbon nanoparticles of the fulleroid type collected on the anodic plate.

7. The method of claim 6, wherein the organic solvent is dimethylformamide.

8. The method of claim 2, further comprising:
obtaining a cathode deposit by an electro-arched erosion of an anode graphite rod in a helium atmosphere;
separating a dense crust of the cathode deposit from a loose middle;
obtaining the multi-layered carbon nanostructures with the help of the gas-phase oxidation of the dense crust.

9. The method of claim 8, further comprising:
milling the dense crust.

10. The method of claim 8, further comprising:
placing the dense crust in a superhigh frequency field.

11. The method of claim 8, wherein the gas-phase oxidation of the dense crust is carried out in an atmosphere comprising oxygen.

12. The method of claim 11, wherein the atmosphere comprises a quantity of oxygen in a range from 20% to 60%.

13. The method of claim 8, wherein, after the gas-phase oxidation and before the exposure of the powder on the electric field, the multi-layered carbon nanostructures are additionally oxidized electrochemically in an aqueous electrolyte comprising solutions of chlorine compounds.

14. The method of claim 8, wherein, after the gas-phase oxidation and before the exposure of the powder on the electric field, the multi-layered carbon nanostructures are additionally treated, this additional treatment comprising:
cooling the multi-layered carbon nanostructures by placing them in a liquid gas;
bubbling a medium comprising the liquid gas and the multi-layered carbon nanostructures;
separating a solid phase of the media from a liquid phase of the media, the solid phase being adapted to form the powder.

15. The method of claim 8, wherein, after the gas-phase oxidation and before the exposure of the powder on the electric field, the multi-layered carbon nanostructures are additionally treated, this additional treatment comprising:

cooling the multi-layered carbon nanostructures by placing them in a liquid gas;
bubbling a medium comprising the liquid gas and the multi-layered carbon nanostructures;
separating a solid phase of the media from a liquid phase of the media;
obtaining the powder from the liquid phase of the media by evaporating the said liquid phase.

16. The method of claim 2, wherein the powder is exposed on the electric field with electric field intensity from 800 V/mm to 1000 V/mm in the inter-electrode gap.

17. The method of claim 10, wherein:
the anode graphite rod has a section in a range of from 30 to 160 mm$^2$;
the electro-arched erosion of the anode graphite rod is operated at a current density in a range of from 80 to 200 A/cm$^2$ with a voltage drop on the arc in a range of from 20 to 28 V in the helium atmosphere at a pressure in a range of from 40 to 100 Torr;
the superhigh frequency field has a frequency of 2.5 GHz and a power in a range of from 500 to 1500 Wt; and
the gas-phase oxidation of the dense crust is realized during a time period in a range of from 100 to 150 min.

18. A Plasticizing agent for concretes for building, said plasticizing agent comprising multi-layered carbon nanoparticles of the fulleroid type produced by a method comprising:
placing a cathodic plate and an anodic plate manufactured from a non-magnetic material in a volume with a dielectric medium, the cathodic plate and the anodic plate being adapted to form an inter-electrode gap,
placing a powder derived from multi-layered carbon nanostructures previously obtained by a gas-phase oxidation, on the cathodic plate;
fixing the anodic plate on a dynamometer,
connecting the cathodic plate and the anodic plate to a source;
exposing the powder on an electric field by applying a supply to the cathodic plate and to the anodic plate;
increasing the potential difference between the cathodic plate and the anodic plate until appearing of a self-emission current in the inter-electrode gap;
registering by the dynamometer an attractive anode/cathode force as a function of the self-emission current;
removing the potential difference applied on the cathodic plate and on the anodic plate when the force acting in the inter-electrode gap stops growing;
filling the volume with an inert gas;
collecting the multi-layered carbon nanoparticles of the fulleroid type accumulated on the anodic plate,
determining radiographically an inter-layer distance of the multi-layered carbon nanoparticles of the fulleroid type,
determining a shape, an averaged size, a ratio between an outer diameter and a thickness of a multi-layered body of the multi-layered carbon nanoparticles of the fulleroid type under a transmission electron microscope,
wherein the multi-layered carbon nanoparticles are multi-layered nanoparticles of the fulleroid type according to claim 1.

19. A Reinforcing agent for structural composite materials, said reinforcing agent comprising multi-layered carbon nanoparticles of the fulleroid type produced by a method comprising:
placing a cathodic plate and an anodic plate manufactured from a non-magnetic material in a volume with a dielectric medium, the cathodic plate and the anodic plate being adapted to form an inter-electrode gap, placing a powder derived from multi-layered carbon nanostructures previously obtained by a gas-phase oxidation, on the cathodic plate;

fixing the anodic plate on a dynamometer, connecting the cathodic plate and the anodic plate to a source;

exposing the powder on an electric field by applying a supply to the cathodic plate and to the anodic plate;

increasing the potential difference between the cathodic plate and the anodic plate until appearing of a self-emission current in the inter-electrode gap;

registering by the dynamometer an attractive anode/cathode force as a function of the self-emission current;

removing the potential difference applied on the cathodic plate and on the anodic plate when the force acting in the inter-electrode gap stops growing;

filling the volume with an inert gas;

collecting the multi-layered carbon nanoparticles of the fulleroid type accumulated on the anodic plate, determining radiographically an inter-layer distance of the multi-layered carbon nanoparticles of the fulleroid type, determining a shape, an averaged size, a ratio between an outer diameter and a thickness of a multi-layered body of the multi-layered carbon nanoparticles of the fulleroid type under a transmission electron microscope, wherein the multi-layered carbon nanoparticles are multi-layered nanoparticles of the fulleroid type according to claim 1.

20. A Component of a nonlinear optical media, said component comprising multi-layered carbon nanoparticles of the fulleroid type produced by a method comprising:

placing a cathodic plate and an anodic plate manufactured from a non-magnetic material in a volume with a dielectric medium, the cathodic plate and the anodic plate being adapted to form an inter-electrode gap, placing a powder derived from multi-layered carbon nanostructures previously obtained by a gas-phase oxidation, on the cathodic plate;

fixing the anodic plate on a dynamometer, connecting the cathodic plate and the anodic plate to a source;

exposing the powder on an electric field by applying a supply to the cathodic plate and to the anodic plate;

increasing the potential difference between the cathodic plate and the anodic plate until appearing of a self-emission current in the inter-electrode gap;

registering by the dynamometer an attractive anode/cathode force as a function of the self-emission current;

removing the potential difference applied on the cathodic plate and on the anodic plate when the force acting in the inter-electrode gap stops growing;

filling the volume with an inert gas;

collecting the multi-layered carbon nanoparticles of the fulleroid type accumulated on the anodic plate, determining radiographically an inter-layer distance of the multi-layered carbon nanoparticles of the fulleroid type, determining a shape, an averaged size, a ratio between an outer diameter and a thickness of a multi-layered body of the multi-layered carbon nanoparticles of the fulleroid type under a transmission electron microscope, wherein the multi-layered carbon nanoparticles are multi-layered nanoparticles of the fulleroid type according to claim 1.

* * * * *